United States Patent
Dattler

(10) Patent No.: US 9,014,961 B2
(45) Date of Patent: Apr. 21, 2015

(54) METHOD AND DEVICE FOR AIDING THE NAVIGATION OF AN AIRCRAFT FLYING AT A LOW ALTITUDE

(75) Inventor: Stéphane Dattler, Montlaur (FR)

(73) Assignee: Airbus Operations (SAS), Toulouse (FR)

( * ) Notice: Subject to any disclaimer, the term of this patent is extended or adjusted under 35 U.S.C. 154(b) by 679 days.

(21) Appl. No.: 12/882,848

(22) Filed: Sep. 15, 2010

(65) Prior Publication Data

US 2011/0066370 A1     Mar. 17, 2011

(30) Foreign Application Priority Data

Sep. 17, 2009   (FR) .................................... 09 04439

(51) Int. Cl.
 *G01S 19/20*      (2010.01)
 *G01S 19/15*      (2010.01)

(52) U.S. Cl.
 CPC ... *G01S 19/15* (2013.01); *G01S 19/20* (2013.01)

(58) Field of Classification Search
 CPC ......... G01S 19/08; G01S 19/15; G01S 19/20; G01C 5/005
 USPC ........... 701/4, 5, 8, 9, 10, 14, 16, 17, 18, 445, 701/468, 469, 470, 473, 518, 300, 301; 342/357.21–357.77; 340/963, 970, 977
 See application file for complete search history.

(56) References Cited

U.S. PATENT DOCUMENTS

| | | | |
|---|---|---|---|
| 7,782,229 B1 * | 8/2010 | Barber | 340/979 |
| 2002/0116098 A1 | 8/2002 | Maynard | |
| 2004/0189492 A1 * | 9/2004 | Selk et al. | 340/973 |
| 2008/0062041 A1 | 3/2008 | Lee | |
| 2008/0294306 A1 * | 11/2008 | Huynh et al. | 701/3 |

FOREIGN PATENT DOCUMENTS

| | | |
|---|---|---|
| EP | 1956386 | 8/2008 |
| EP | 2015097 | 1/2009 |
| WO | WO 02/04974 | 1/2002 |

OTHER PUBLICATIONS

Wolfgang Schuster et al; Gate-To-Gate with Modernized GPS, Galileo and GBAS-Harmonization of Precision Approach Performance Requirements; ION GNSS 19th Intl. Tech. Meeting of The Satellite Divison, Sep. 2006.
RTCA, Inc, "Minimum operational performance standards for global positioning systems/ aircraft-based augmentation system airborne equipment", RTCA DO 316. (Apr. 14, 2009) (174 pages).

* cited by examiner

*Primary Examiner* — Spencer Patton
(74) *Attorney, Agent, or Firm* — Novak Druce Connolly Bove + Quigg LLP

(57) ABSTRACT

A method and device for aiding the navigation of an aircraft flying at low altitude as described. The device (1) includes positioning means (2) generating the current position of the aircraft, and calculation means (4) for detecting when the budgets allocated to a position error of the aircraft are exceeded by protection ranges.

6 Claims, 3 Drawing Sheets

METHOD AND DEVICE FOR AIDING THE NAVIGATION OF AN AIRCRAFT FLYING AT A LOW ALTITUDE

CROSS-REFERENCE TO RELATED APPLICATIONS

This application claims priority to French Patent Application 0904439, filed Sep. 17, 2009, the entire contents of which are incorporated herein by reference.

FIELD OF THE INVENTION

The present invention relates to an assistance method and device for the navigation of an aircraft flying at a low altitude.

BACKGROUND OF THE INVENTION

More specifically, the method applies to a budget (or a height interval with respect to the ground) being allocated to a position error of the aircraft, generated by a positioning system.

This invention more particularly applies, although not exclusively, to a method using, for the navigation of the aircraft, a satellite positioning system, such as the GPS positioning system (Global Positioning System).

An assistance method is known for the navigation of an aircraft flying at a low altitude, using a budget allocated to a position error and a budget allocated to a guiding error. Such budgets are estimated at an integrity risk corresponding to the probability that the value of the real error is higher than the budget allocated to such an error. In such a usual method, the budget allocated to the position error and the budget allocated to the guiding error are calculated for a same given integrity risk being equal to the desired integrity risk for a total budget, such a total budget being equal to the sum of the budget allocated to the guiding error and the budget allocated to the position error.

In such a method, a comparison in real time is made between the variable value of a protection range (calculated at the given integrity risk) and the budget allocated to the position error (estimated at such integrity risk), and if the calculated value of the protection range exceeds the budget allocated to the position error, an alarm is emitted indicating to the pilot that the real position value is likely to be higher than the budget being allocated with a higher probability at the integrity risk being considered. The protection range calculated at the given integrity risk is determined, in real time, as known, by a usual calculation being performed from data from the positioning system and taking into account, more particularly, the geometry of the satellites and the inertia situation of the aircraft.

However, such a usual method does not allow to optimize the size of the total budget, resulting in a problem when it comes to minimizing the height of the aircraft flying over the ground, in particular for tricky steering operations during which the ground controlling means are not available (for example, flies at a low altitude with no visibility, for which only the on-board measurement and calculation means are able to be used).

Indeed, said usual method triggers an alarm as soon as the protection range exceeds the budget allocated to the position error, and the weaker the given integrity risk, the larger the calculated protection range. Now, in order to prevent any accident risk, the integrity risk is selected weak, and the budget allocated to the position error is sized with respect to such an integrity risk. Indeed, as the protection range is large, the budget allocated to the position error is selected large in order to prevent it from being frequently exceeded by the protection range (variable and calculated in real time at the given integrity risk), that would lead to the alarm being frequently triggered, increasing the total budget.

Moreover, the total budget is not optimized, as it is equal to the sum of the budget allocated to the position error and the budget allocated to the guiding error, being estimated at the given integrity risk.

SUMMARY OF THE INVENTION

The present invention aims at solving the above mentioned drawbacks, and relates to an assistance method for the navigation of an aircraft flying at a low altitude, allowing to detect when a protection range exceeds a budget allocated to a position error of the aircraft, the budget allocated to the position error being equal to the difference between a total budget and a budget allocated to a guiding error of the aircraft.

To this end, said method is remarkable, according to this invention, in that:

a) a first given integrity risk and a second integrity risk, being higher than said first integrity risk, are defined:

b) two budgets being allocated to the position error are calculated, respectively defined at such two integrity risks, using two budgets allocated to the guiding error and a total budget;

c) repeatedly while the aircraft is flying, two protection ranges are calculated respectively at the first integrity risk and at the second integrity risk and such two protection ranges are compared respectively to the two budgets allocated to the position error respectively defined at those two integrity risks; and d) an alarm is emitted if the protection range calculated at one of the two integrity risks exceeds the corresponding budget allocated to the position error defined at said integrity risk.

Thus, thanks to this invention, the method according to this invention allows the total budget to be optimized, thus optimizing the budget allocated to the position error with respect to the budget allocated to the guiding error while taking into account the protection range calculated at the second integrity risk, being lower than the protection range calculated at the first integrity risk.

Otherwise stated, said method takes into account two integrity risks for sizing the budgets allocated to the position error and to the guiding error, allowing the alarm to be triggered only when this proves to be necessary, while providing the safety of the aircraft flying over the ground.

Advantageously, the total budget is estimated at the first integrity risk, and the two budgets allocated to the guiding error are estimated respectively at a fixed integrity risk (being equal to the ratio between the first integrity risk and the second integrity risk) and at said first integrity risk.

Preferably, said second integrity risk is lower than said fixed integrity risk.

At step b), in order to calculate the budget allocated to the position error defined at the second integrity risk, the difference is made between the total budget estimated at the first integrity risk and the budget allocated to the guiding error estimated at the first integrity risk.

Moreover, in order to calculate the budget allocated to the position error defined at the first integrity risk, the difference is made between the total budget estimated at the first integrity risk and the budget allocated to the guiding error estimated at the fixed integrity risk.

Furthermore, advantageously, the value of the first integrity risk is equal to $1 \times 10^{-7}$ for one hour of flight, the value of the fixed integrity risk is equal to $1\times10^{-3}$ for one hour of flight, and the value of the second integrity risk is equal to $1\times10^{-4}$ for one hour of flight.

Moreover, preferably, from the ground, the value of the total budget is 100 meters, the value of the budget allocated to the guiding error at the fixed integrity risk is 30 meters, and the value of the budget allocated to the guiding error at the first integrity risk is 60 meters.

The present invention further relates to an assistance device for the navigation of an aircraft flying at a low altitude, allowing to detect whether a protection range exceeds a budget allocated to a position error of the aircraft, said device comprising:

positioning means for generating the current position of said aircraft and a protection range;

signaling means; and calculation means being connected to said positioning means and said signaling means, and calculating the budget allocated to a position error making the difference between a total budget and a budget allocated to a guiding error of the aircraft.

The device according to this invention is remarkable in that:

said calculation means comprise an element for calculating two budgets allocated to the position error, respectively defined at a first given integrity risk and at a second integrity risk being higher than said first integrity risk, while using two budgets allocated to the guiding error and a total budget, and an element for comparing the two budgets allocated to the position error at two protection ranges calculated at the first integrity risk and at the second integrity risk through the positioning means; and said signaling means are formed so as to emit an alarm if the protection range calculated relative to one of the two integrity risks exceeds the budget allocated to the corresponding position error (defined at said integrity risk).

The present invention also relates to an aircraft being provided with an assistance device for the navigation as Mentioned previously.

BRIEF DESCRIPTION OF THE DRAWINGS

The figures of the appended drawings will better explain how this invention can be implemented. In these figures, like reference numerals relate to like components.

DETAILED DESCRIPTION

In the remainder of the description, the term "budget" refers to a height interval with respect to the ground S, and the integrity risk at which any budget is defined or estimated corresponds to the probability that the value of the error as measured on the budget is higher than the value of the error estimated for the budget being considered. A large, respectively low, integrity risk corresponds to a large, respectively low, probability that the value of the error as measured on the budget is higher than the value of the error estimated for the budget being considered.

Figure 1:
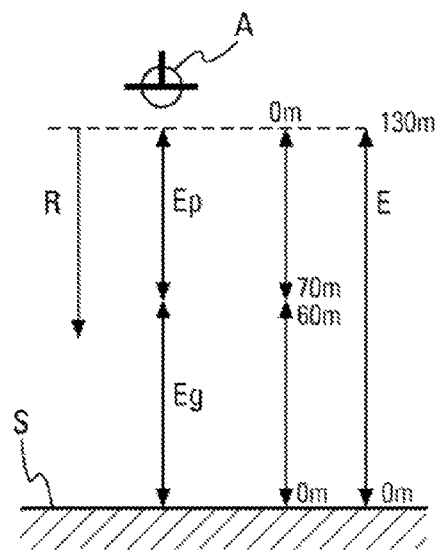
FIG. 1 schematically shows a budget allocated to a position error of an aircraft flying at a low altitude being exceeded by a protection range according to a method of the state of the art.

Referring to FIG. 1, in the method of the state of the art, a total budget E is estimated at a given integrity risk P. It is equal to the sum of a budget allocated to a position error Ep, estimated at the given integrity risk P, and of a budget allocated to a guiding error Eg, also estimated at such a given integrity risk P.

In the example being shown as an illustration, the value of the given integrity risk P is equal to $1\times10^{-7}$ for one hour of flight of the aircraft A, the value of Eg is equal to 60 meters with respect to the ground S, the value of E is equal to 130 meters with respect to the ground S, and the value of Ep is equal to the difference between the values of E ad Eg, i.e. 70 meters.

A protection range R is calculated, as usual, by a known calculation method and if it exceeds the budget Ep, an alarm is emitted for making the pilot aware of such an excess.

Figure 2:
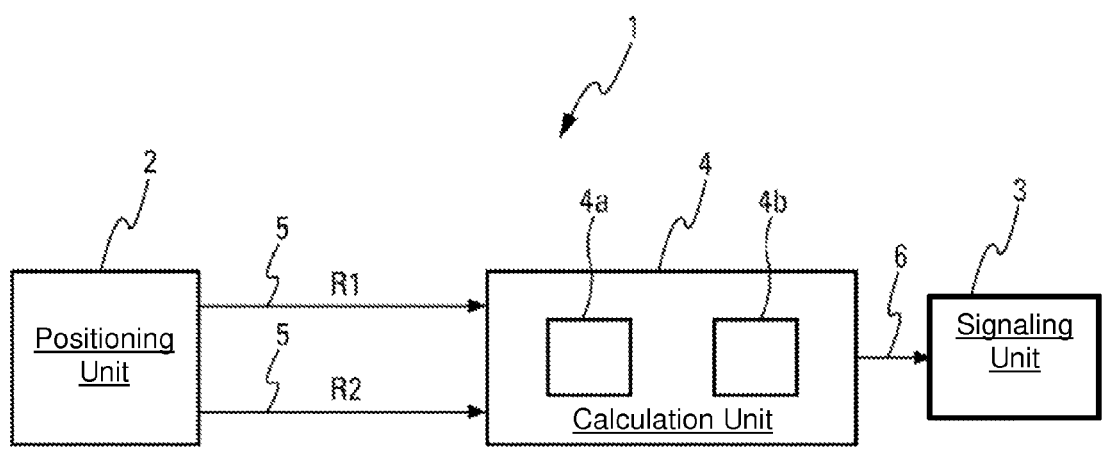
FIG. 2 is the block diagram of an assistance device according to this invention for the navigation of an aircraft.

Referring to FIG. 2, an assistance device 1 for the navigation of the aircraft flying at a low altitude, according to this invention, comprises:

positioning means 2 comprising a positioning system of the GPS type;

signaling means; and calculation means 4 being connected upstream, via links 5, to the positioning means 2, and downstream, via a link 6, to the signaling means 3.

According to this invention, the positioning unit 2 calculates two protection ranges R1 and R2 respectively at a first given integrity risk P1 and at a second integrity risk P2 being higher than said first integrity risk P1, then transmit them via the links 5 to the calculation unit 4.

In this case, as an illustration, the value of the first integrity risk P1 is equal to $1\times10^{-7}$ for one hour of flight, corresponding to the low integrity risk, and the value of the second integrity risk P2 is equal to $1\times10^{-4}$ for one hour of flight, corresponding to the high integrity risk.

The calculation means 4 compares the protection ranges R1 and R2 respectively to the budgets allocated to the position error Ep1 and Ep2, as described on FIGS. 3 to 6. If the protection range R1 exceeds Ep1 or if the protection range R2 exceeds Ep2, then an alarm is triggered by the signaling means 3. In other cases, the alarm is not triggered by the signaling means 3.

The budgets allocated to the position error Ep1 and Ep2 are determined as follows, as illustrated on FIG. 3.

Two budgets are estimated, allocated to the guiding error Eg1 and Eg2 respectively at a fixed integrity risk P0 (equal to the ratio between the first integrity risk P1 and the second integrity risk P2), and at the first integrity risk P1.

In this case, as an illustration, the value of the fixed integrity risk P0 is equal to $1\times10^{-3}$ for one hour of flight, the value of Eg1 is equal to 30 meters with respect to the ground S, and the value of Eg2 is equal to 60 meters with respect to the ground S.

Furthermore, a constant total budget Et is estimated at the first integrity risk P1.

In this case, as an illustration, the value of Et is equal to 100 meters with respect to the ground S.

If the variable value of the guiding error Ega determined by the calculation means 4 is equal to or higher than the budget allocated to the guiding error Eg1 estimated at the fixed integrity risk P0, the fixed integrity risk P0 is reached. To cause the first integrity risk P1 to be reached so as to use the total budget Et (estimated at the first integrity risk P1 equal to the product of the fixed integrity risk P0 by the second integrity risk P2), the budget allocated to the position error Ep2 is defined at the second integrity risk P2. To cause the total budget Et to be met, the budget allocated to the position error Ep2 is equal to the difference between the total budget Et and the budget allocated to the guiding error Eg2 estimated at the first integrity risk P1.

If the variable value of the guiding error Egb determined by the calculation means 4 is lower than the budget allocated to the guiding error Eg1 estimated at the fixed integrity risk P0, the fixed integrity risk P0 is not reached. To cause the first integrity risk P1 to be reached for using the total budget Et (estimated at the first integrity risk P1), the budget allocated to the position error Ep1 is defined at the given integrity risk P1. To cause the total budget Et to be met, the budget allocated to the position error Ep1 is equal to the difference between the total budget Et estimated at the given integrity risk P1 and the budget allocated to the guiding error Eg1 estimated at the fixed integrity risk P0.

Thus, otherwise stated, the total budget Et is a constant equal to Eg1+Ep1 or to Eg2+Ep2.

From the values considered as an illustration for the budget allocated to the guiding error Eg1 (estimated at the fixed integrity risk P0), the budget allocated to the guiding error Egg estimated at the first integrity risk P1 and the total budget Et, it can be inferred that the value of Ep1 is equal to 70 meters and the value of Ep2 is equal to 40 meters.

When the two budgets allocated to the position error Ep1 and Ep2 are determined by the element 4a of the calculation means 4, the element 4b of said calculation means 4 evaluates the positions of the two protection ranges R1 and R2 with respect to those two budgets Ep1 and Ep2.

Four cases are then able to be contemplated.

Figure 3:
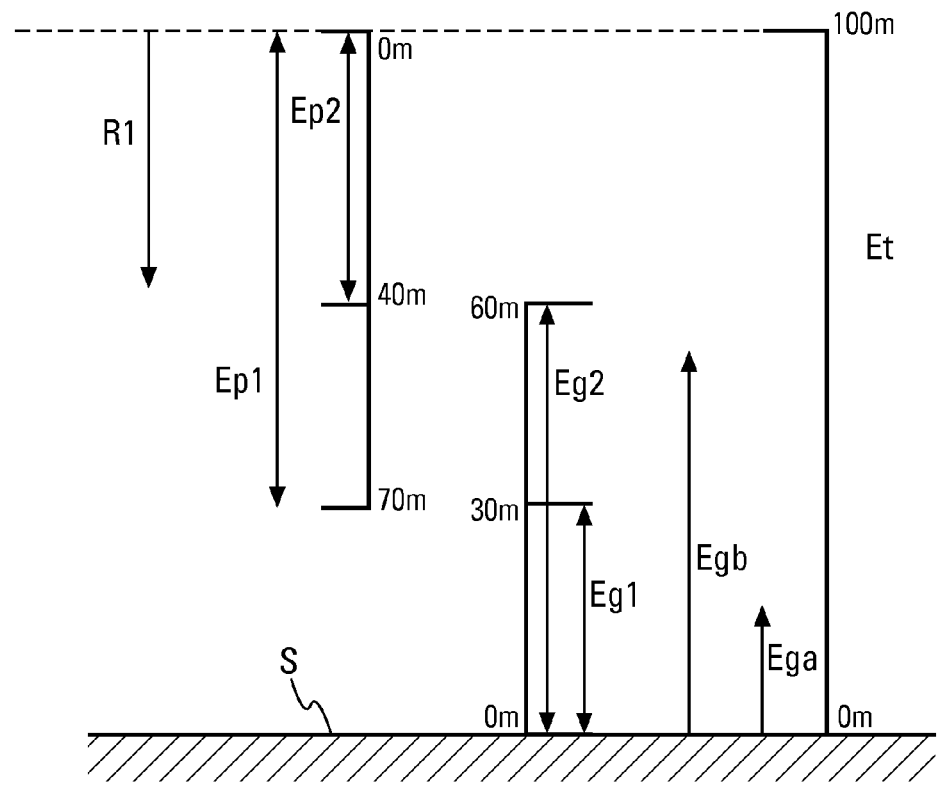
FIGS. 3 to 6 schematically show the set of the possible values of the two protection ranges with respect to two budgets allocated to the position error of an aircraft flying at a low altitude and defined according to the present invention.

In the first case illustrated on FIG. 3, the protection range R1 calculated at the first integrity risk P1 is lower than the budget Ep2, i.e. lower than 40 meters. No alarm is triggered in such a case by the signaling means 3, as the budgets allocated to the position error Ep1 and the position error Ep2 are not exceeded by the protection range R1 and all the more by the protection range R2 (being lower than the protection range R1).

Figure 4:
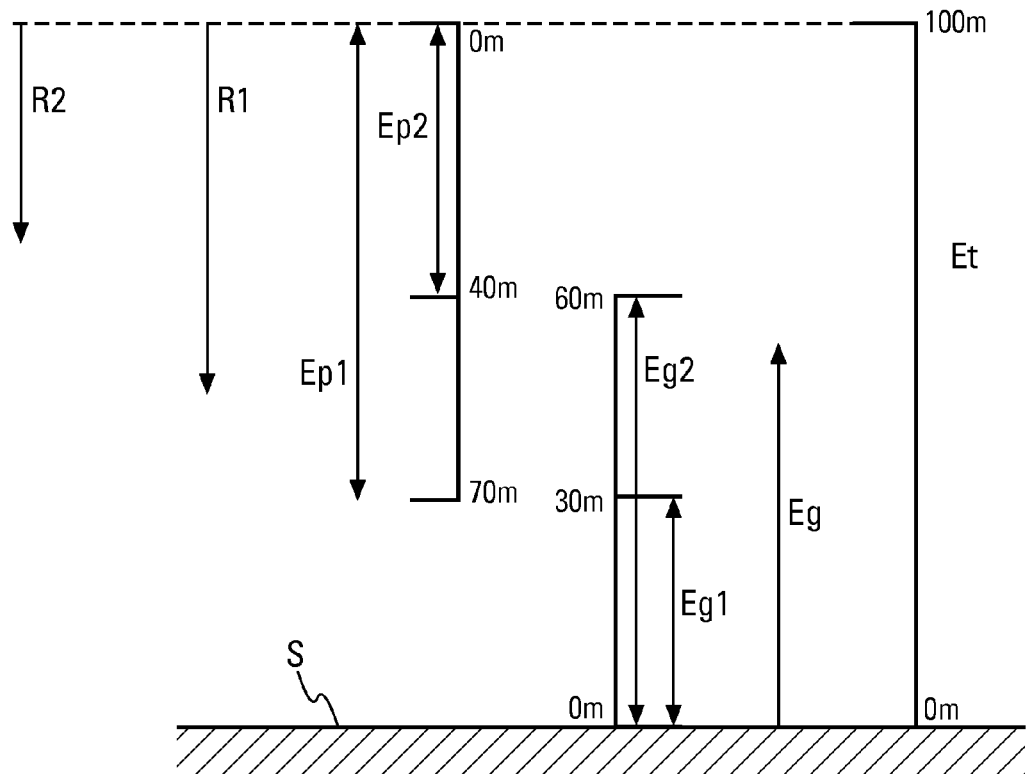

In a second case, as illustrated on FIG. 4, the protection range R1 calculated at the first integrity risk P1 exceeds the value of the budget Ep2, but does not exceed the budget Ep1, i.e. is higher than 40 meters and lower than 70 meters, and the protection range R2 calculated at the second integrity risk. P2 does not exceed the value of the budget Ep2, i.e. is lower than 40 meters. No alarm is triggered in such a case by the signaling means 3, as the budgets allocated to the position error Ep1 and the position error Ep2 are not exceeded by the respective protection ranges R1 and R2.

Figure 5:
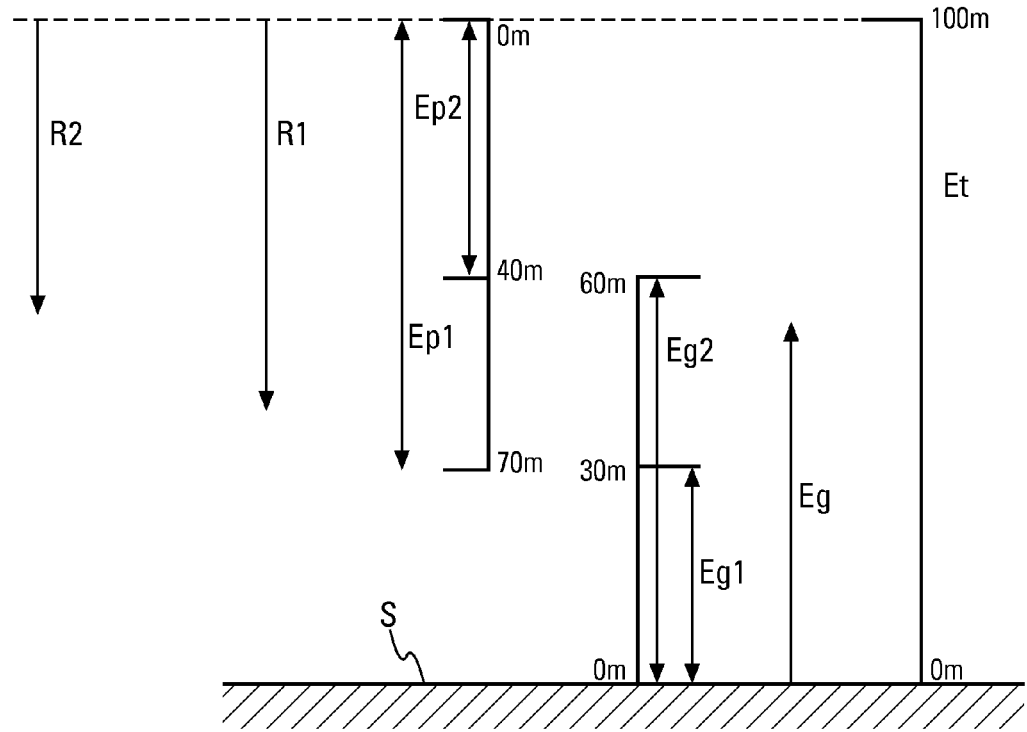

In a third case, as illustrated on FIG. 5, the protection range R1 calculated at the first integrity risk P1 exceeds the value of the budget Ep2, but does not exceed the budget Ep1, i.e. is higher than 40 meters and lower than 70 meters, and the protection range R2 calculated at the second integrity risk P2 exceeds the value of the budget Ep2, i.e. is higher than 40 meters. An alarm is then triggered by the signaling means 3, as the budget allocated to the position error Ep2 is exceeded by the protection range R2.

Figure 6:
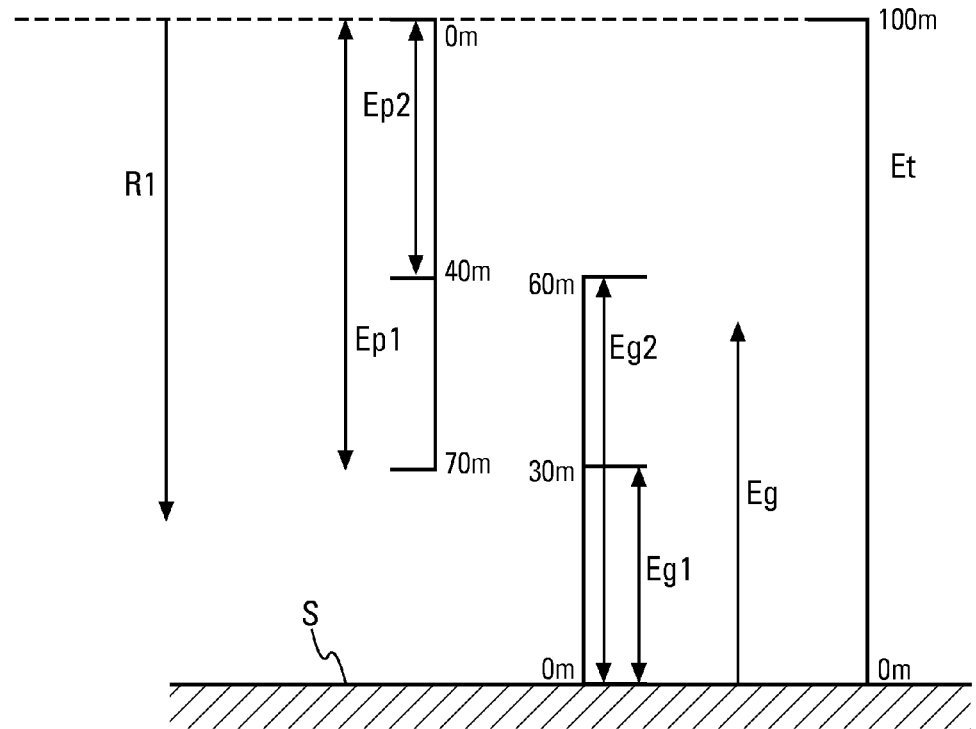

In a fourth case illustrated on FIG. 6, the protection range R1 calculated at the first integrity risk P1 exceeds the budget Ep1 at the first integrity risk P1, i.e. is higher than 70 meters. An alarm is then triggered by the signaling means 3, as the budget allocated to the position error Ep1 is exceeded by the protection range R1.

Thus, the assistance device for the navigation 1 according to this invention allows the total budge Et to be optimized, while optimizing the budget allocated to the position error with respect to the budget allocated to the guiding error taking into account the protection range R2 calculated at a second integrity risk P2 being higher than the first integrity risk P1 and for which the protection range R2 is lower than the protection range R1 calculated at the first integrity risk P1. Otherwise stated, the assistance device for the navigation 1 takes into consideration the two integrity risks for sizing the budgets allocated to the position error and to the guiding error. Said device 1 allows to combine, in real time, independent events for the position error and the guiding error determined at two different integrity risks, a large integrity risk ($1 \times 10^{-4}$) and a low integrity risk ($1 \times 10^{-7}$), while meeting the total budget on the error estimated at the low integrity risk ($1 \times 10^{-7}$).

Moreover, as the total budget Et is estimated at a low integrity risk, the device 1 according to this invention ensures that the aircraft A is flying over the ground in significant safety conditions.

The invention claimed is:

1. An assistance method for the navigation of an aircraft (A) flying at a low altitude, and for detecting that a budget has been exceeded by a protection range, the protection range being allocated to a position error of the aircraft (A), the budget being equal to the difference between a total budget and a budget allocated to a guiding error of the aircraft (A), comprising:
 a) defining a first given integrity risk (P1) and a second integrity risk (P2), being higher than said first integrity risk (P1);
 b) calculating, by a calculation unit on-board said aircraft, two budgets being allocated to the position error (Ep1, Ep2), respectively defined at a first integrity risk (P1) and a second integrity risk (P2), using two budgets allocated to the guiding error (Eg1, Eg2) and a total budget (Et), the total budget (Et) being estimated at the first integrity risk (P1), and the two budgets allocated to the guiding error (Eg1, Eg2) being respectively estimated at a fixed integrity risk (P0) being equal to the ratio between the first integrity risk (P1) and the second integrity risk (P2) and at said first integrity risk (P1), and performing the following operations:
  calculating the budget allocated to the position error (Ep2) defined at the second integrity risk (P2), by calculating the difference between the total budget (Et) estimated at the first integrity risk (P1) and the budget allocated to the guiding error (Eg2) estimated at the first integrity risk (P1); and
  calculating the budget allocated to the position error (Ep1) defined at the first integrity risk (P1), by calculating the difference between the total budget (Et) estimated at the first integrity risk (P1) and the budget allocated to the guiding error (Eg1) estimated at the fixed integrity risk (P0);
 c) calculating, by the calculation unit on-board said aircraft, repeatedly while the aircraft (A) is flying, two protection ranges (R1, R2), respectively at the first integrity risk (P1) and at the second integrity risk (P2) and such two protection ranges (R1, R2) are compared respectively to the two budgets allocated to the position error (Ep1, Ep2) respectively defined at those two integrity risks (P1, P2); and
 d) emitting an alarm if the protection range (R1, R2) calculated at one of the two integrity risks (P1, P2) exceeds the corresponding budget being allocated to the position error (Ep1, Ep2) defined at said integrity risk (P1, P2).

2. The assistance method for the navigation according to claim 1, wherein the second integrity risk (P2) is lower than the fixed integrity risk (P0).

3. The assistance method for the navigation according to claim 1, wherein the value of the first integrity risk (P1) is equal to $1 \times 10^{-7}$ for one hour of flight, the value of the fixed integrity risk (P0) is equal to $1 \times 10^{-3}$ for one hour of flight, and the value of the second integrity risk (P2) is equal to $1 \times 10^{-4}$ for one hour of flight.

4. The assistance method for the navigation according to claim 3, wherein from the ground (S), the value of the total budget (Et) is equal to 100 meters, the value of the budget allocated to the guiding error (Eg1) at the fixed integrity risk (P0) is equal to 30 meters, and the value of the budget allocated to the guiding error (Eg2) at the first integrity risk (P1) is equal to 60 meters.

5. A assistance device for the navigation of an aircraft (A) flying at a low altitude, allowing for detection of when a budget allocated to a position error of the aircraft (A) is exceeded by a protection range, said device (1) comprising:
   a calculation unit (4) adapted:
      to calculate two budgets allocated to the position error (Ep1, Ep2), respectively defined at a first given integrity risk (P1) and at a second integrity risk (P2) being higher than said first integrity risk (P1), using two budgets allocated to the guiding error (Eg1, Eg2) and a total budget (Et), the total budget (Et) is estimated at the first integrity risk (P1), and the two budgets allocated to the guiding error (Eg1, Eg2) are respectively estimated at a fixed integrity risk (P0) being equal to the ratio between the first integrity risk (P1) and the second integrity risk (P2), and at said first integrity risk (P1);
      to calculate the budget allocated to the position error (Ep2) defined at the second integrity risk (P2), by calculating the difference between the total budget (Et) estimated at the first integrity risk (P1) and the budget allocated to the guiding error (Eg2) estimated at the first integrity risk (P1);
      to calculate the budget allocated to the position error (Ep1) defined at the first integrity risk (P1), by calculating the difference between the total budget (Et) estimated at the first integrity risk (P1) and the budget allocated to the guiding error (Eg1) estimated at the fixed integrity risk (P0); and
      to compare the two budgets allocated to the position error (Ep1, Ep2) to the two protection ranges (R1, R2) calculated at the first integrity risk (P1) and at the second integrity risk (P2) by the positioning unit (2); and
   an alarm, adapted to sound if the protection range (R1, R2) calculated at one of the two integrity risks (P1, P2) exceeds the corresponding budget allocated to the position error (Ep1, Ep2) defined at said integrity risk (P1, P2).

6. An aircraft, comprising an assistance device (1) for the navigation, specified according to claim 5.

* * * * *